(12) United States Patent
Hyman et al.

(10) Patent No.: US 8,930,946 B1
(45) Date of Patent: Jan. 6, 2015

(54) LEASING PRIORITIZED TASKS

(75) Inventors: Josh Hyman, Los Angeles, CA (US); Dustin Boswell, Agoura Hills, CA (US)

(73) Assignee: Google Inc., Mountain View, CA (US)

( * ) Notice: Subject to any disclaimer, the term of this patent is extended or adjusted under 35 U.S.C. 154(b) by 1880 days.

(21) Appl. No.: 12/031,516

(22) Filed: Feb. 14, 2008

(51) Int. Cl.
*G06F 9/46* (2006.01)

(52) U.S. Cl.
USPC .............................................. 718/1

(58) Field of Classification Search
None
See application file for complete search history.

(56) References Cited

U.S. PATENT DOCUMENTS

| | | | | |
|---|---|---|---|---|
| 5,109,512 | A * | 4/1992 | Bahr et al. | 718/103 |
| 6,611,835 | B1 * | 8/2003 | Huang et al. | 1/1 |
| 6,854,115 | B1 * | 2/2005 | Traversat et al. | 718/1 |
| 6,993,765 | B2 * | 1/2006 | Suzuki et al. | 718/102 |
| 7,266,821 | B2 * | 9/2007 | Polizzi et al. | 718/100 |
| 2005/0268300 | A1 * | 12/2005 | Lamb et al. | 718/100 |

OTHER PUBLICATIONS

Aguilera, Marcos K., et al., "Sinfonia: A New Paradigm for Building Scalable Distributed Systems," SOSP'07, Oct. 14-17, 2007, Stevenson, Washington, Copyright 2007 ACM, pp. 159-174.
Amazon Simple Queue Service, Developer Guide, API Version Jan. 1, 2008, Copyright © 2008 Amazon Web Services LCC, Jan. 1, 2008, 76 pages.
Banavar, Guruduth, et al., "A Case for Message Oriented Middleware," Distributed Computing, 13th International Symposium, DISC'99, Bratislava, Slovak Republic, Sep. 27-29, 1999 Proceedings, © Springer-Verlag Berlin Heidelberg 1999, 20 pages.
Barroso, Luiz Andre et al., "Web Search for Planet: the Google Cluster Architecture," IEEE Computer Society, Mar.-Apr. 2003, © 2003 IEEE, pp. 22-28. Downloaded on Mar. 6, 2009 from IEEE Xplore.
Chang, Fay et al., "Bigtable: A Distributed Storage System for Structured Data," USENIX Association, OSDI' 06: 7th USENIX Symposium on Operating Systems Design and Implementation, 2006, pp. 205-218.
Dayal, Umeshwar et al., "A Transactional Model for Long-Running Activities," Proceedings of the 17th International Conference on Very Large Data Bases, Barcelona, Sep. 1991, pp. 113-122.
Dean, Jeffrey et al., "MapReduce: Simplified Data Processing, of Large Clusters," Communications of the ACM, Jan. 2008, vol. 51, No. 1, pp. 107-113.
DeCandia, Giuseppe et al., "Dynamo: Amazon's Highly Available Key—value Store," SOSP'07, Oct. 14-17, 2007, Stevenson, Washington, Copyright 2007 ACM, pp. 205-220.
Dijkstra, E.W., "Hierarchical Ordering of Sequential Processes," Acta Informatica 1, (1971) © by Springer Verlag, pp. 115-138.
Eugster, Patrick, Th. et al., "The Many Faces of Publish/Subscibe," ACM Computing Surveys, vol. 35, No. 2, Jun. 2003, © 2003 ACM, pp. 114-131.

(Continued)

*Primary Examiner* — Gregory A Kessler
(74) *Attorney, Agent, or Firm* — Fish & Richardson P.C.

(57) ABSTRACT

Methods, systems, and apparatus, including computer programs encoded on computer storage media, for leasing tasks from multiple prioritized groups. One of the methods includes separating tasks into multiple groups where each task is associated with a respective group identification. The tasks are prioritized in each of the multiple groups where each task is associated with a respective priority identification. A request is received from a worker process for a number of tasks within a group, and a number of the tasks within the group are leased to the worker process for a first time period such that the leased tasks are unavailable to other worker processes during the first time period.

27 Claims, 5 Drawing Sheets

(56) References Cited

OTHER PUBLICATIONS

Gelernter, David, "Generative Communication in Linda," ACM Transactions on Programming Languages and Systems, vol. 7, No. 1, Jan. 1985, © 1985 ACM, pp. 80-112.

Ghemawat, Sanjay et al., "The Google File System," SOSP'03, Oct. 19-22, 2003, Bolton Landing, New York, Copyright 2003 ACM, pp. 29-43.

Hutto, Phillip et al. "Slow Memory: Weakening Consistency to Enhance Concurrency in Distributed Shared Memories*," pp. 302-309, © 1990 IEEE. Downloaded on Mar. 16, 2009 from IEEE Xplore.

Java Message Service, version 1.1, Apr. 12, 2002, JavaTM Message Service Specification ("Specification"), © 2002 Sun Microsystems, 140 pages.

JavaSpaces™ Service Specification, Apr. 2002, 16 pages.

Karger, David et al., "Consistent Hashing and Random Trees: Distributed Caching Protocols for Relieving Hot Spots on the World Wide Web," STOC '97, El Paso, TX, Copyright 1997 ACM, pp. 654-663.

Lamport, Leslie, "Concurrent Reading and Writing," Communications of the ACM, Nov. 1997, vol. 20, No. 7, Copyright © 1977, Association for Computing Machinery, Inc., pp. 806-811.

Lamport, Leslie, "Time, Clocks, and the Ordering of Events in a Distributed System," Communications of the ACM, Jul. 1978, vol. 21, No. 7, © 1978 ACM, pp. 558-565.

Lehman, Tobin J., et al., "Hitting the distributed computing sweet spot with TSpaces," Elsevier, Computer Networks 35 (2001), © 2001 Elsevier Science B.V., pp. 457-472.

Search Results: features.html, MySQL, Search Results 1-10 of about 452 for features.html [online] [retrieved on Oct. 14, 2009]. © 1995-2008 MySQL AB, 2008, Sun Microsystems, Inc. Retrieved from the Internet: http://search.mysql.com/search?q=features.html&lr=lang_en, 2 pages.

Search Results: what-is-mysql.html, Search Results 1-8 of about 8 for what-is-mysql.html [online] [retrieved on Oct. 14, 2009]. © 1995-2008 MySQL AB, 2008, Sun Microsystems, Inc. Retrieved from the Internet: http://search.mysql.com/search?q=what-is-mysql.html&lr=lang_en, 2 pages.

Saito, Yasushi et al., "Manageability, Availability and Performance in Porcupine: a Highly Scalable, Cluster-based Mail Service," SOSP-17, Dec. 1999, Kiawah Island, SC, © 1999 ACM, pp. 1-15.

Sun Java System Message Queue, Version 3 2005Q1 (3.6), Jan. 24, 2005, Part No. 819-0064-12, Sun Microsystems, Inc., pp. 1-30.

Sun Java System Message Queue, Version 4.3 Release Notes, Dec. 2008, Part No. 820-6361, Sun Microsystems, Inc., pp. 1-48.

Stoica, Ion et al., "Chord: A Scalable Peer-to-peer Lookup Service for Internet Applications," SIGCOMM'01, Aug. 21-31, 2001, San Diego, California, Copyright 2001 ACM, pp. 149-160.

"WebSphere MQ V6 Fundamentals," First Edition (Nov. 2005), IBM Redbook, © Copyright International Business Machines Corporation 2005, 446 pages.

Welsh, Matt et al., "SEDA: An Architecture for Well-Conditioned, Scalable Internet Services," SOSP, Banff, Canada, 2001, © 2001 ACM, pp. 230-243.

\* cited by examiner

US 8,930,946 B1

LEASING PRIORITIZED TASKS

BACKGROUND

Managing the flow of work in a large, distributed computing system requires a high degree of coordination. A typical example is web crawling, which involves crawling a large number of uniform resource locators (URLs) on the Internet to extract information from associated web pages. Absent a software process to coordinate crawling the URLs, web crawling using parallel processes may not be performed as efficiently as possible. For example, a web crawling process can become delayed when a host computer associated with a URL to be crawled is unavailable since the crawling process may wait for the host to come online rather than crawl other URLs. Descriptions of tasks to be performed in parallel, such as by web crawling processes, are commonly stored in file systems or databases. Access to file systems and databases by parallel processes can become bottleneck as the number of processes increases, however.

SUMMARY

In general, one aspect of the subject matter described in this specification can be implemented in a method that includes prioritizing tasks in multiple groups and leasing the prioritized tasks to one or more worker processes for a time period. The tasks can be separated into multiple groups, where each task is associated with a respective group identification. The tasks in each of the multiple groups can be prioritized, where each task is associated with a respective priority identification. A request for a number of tasks within a group can be received from a worker process. The number of the tasks within the group can be leased to the worker process for a time period such that the leased tasks are unavailable to other worker processes during the time period. Other implementations of this aspect include corresponding systems, apparatus, and computer program products.

These and other implementations can optionally include one or more of the following features. A task can specify an action to be performed by a worker process. The task can designate a Uniform Resource Locator (URL) for the worker process to crawl. Tasks can be ordered in a table based on group identification and priority identification. A portion of each group's tasks can be cached, where cached tasks are of a higher priority than non-cached tasks in a group. Each group's respective cached portion can be determined based on predictive leasing of each group. The number or the group for the tasks requested can be specified by the worker process. It can be determined that a lease for the leased tasks has expired based on the time period, and other worker processes can be allowed to lease the leased tasks based on the determining. The lease can be renewed for the worker process for another time period such that the leased tasks are unavailable to the other worker processes during the another time period. A result produced from a task finished by the worker process can be obtained and stored as a new task in one of the groups.

Particular embodiments of the subject matter described in this specification can be implemented to realize one or more of the following advantages. A large number of tasks can be leased to parallel worker processes. Tasks can be organized based on their respective groups and/or respective priorities. One or more tasks can be leased to a worker process exclusively for a predetermined period of time such that the tasks are unavailable to other worker processes. The predetermined period of time can be specified by the worker process. A lease can be extended further for a specified time by the worker process.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
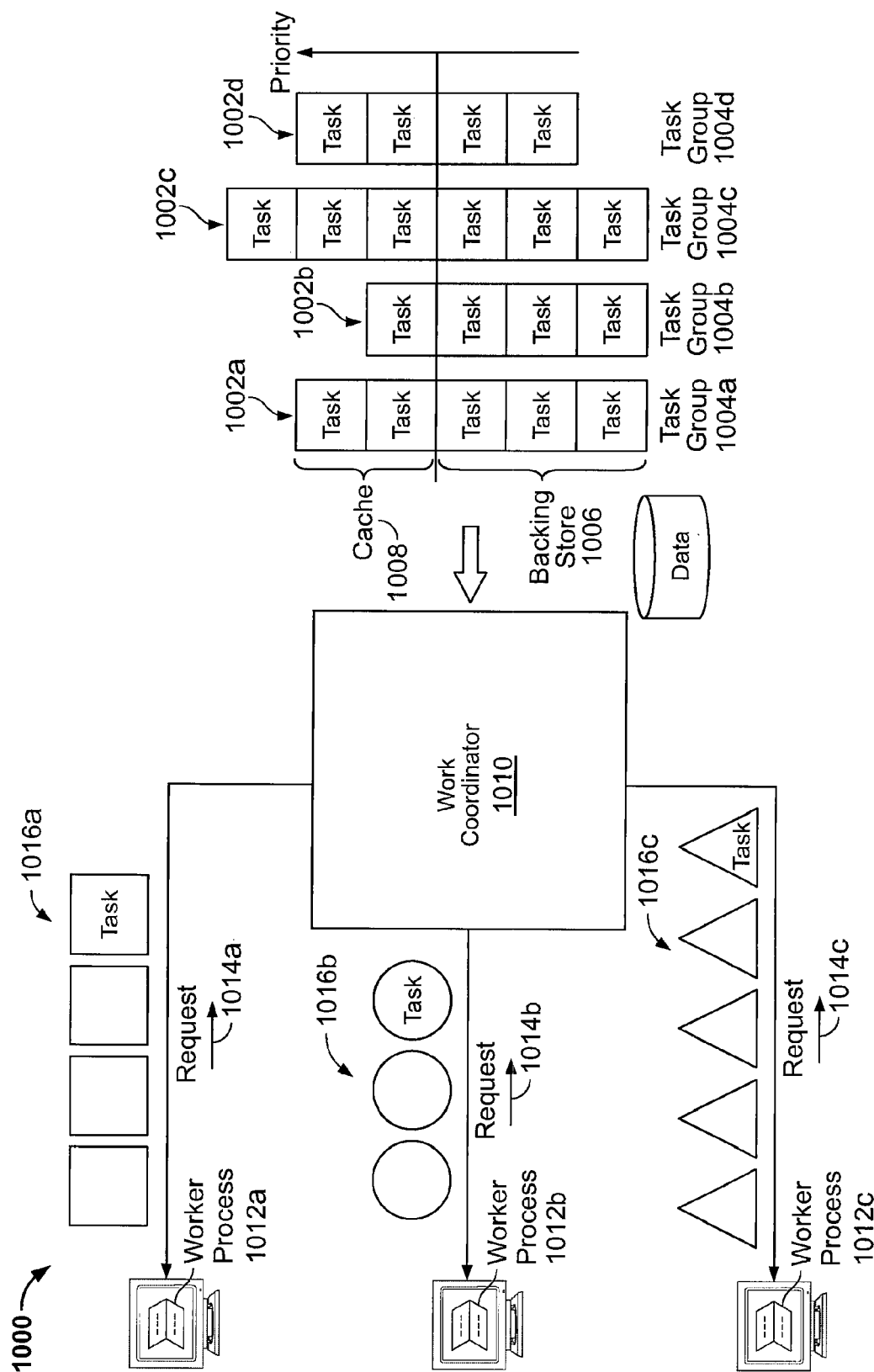
FIG. 1 illustrates an example system for organizing multiple units of work (tasks) and distributing them among different parallel worker processes upon their requests.

FIG. 1 illustrates an example system 1000 for organizing multiple units of work (tasks) and distributing them among different parallel worker processes upon requests. A work coordinator 1010 is a work management process that is capable of managing a large number of tasks (e.g., 1002a-1002d) for so-called worker processes (e.g., 1012a-1012c). A worker process is an instance of a computer program that is executed in the system 1000. The illustrated components of the system 1000 can be implemented on one or more computing devices connected by one or more networks or other data communication means, for example.

In various implementations, the work coordinator 1010 organizes and prioritizes tasks within different task groups (e.g., 1004a-1004d). A task specifies an action or actions to be performed by a worker process. By way of illustration, a task can specify a program to debug, a URL to crawl, or a web page to extract content.

Tasks can be persisted in a so-called backing store 1006, which is generally a database or other system for organizing and storing information on a storage device such as a hard disk, a random access memory (RAM), combinations of these, or other devices.

In various implementations, the work coordinator 1010 moves a portion of the tasks 1002a-1002d from each task group 1004a-1004d into a cache 1008 in advance, to minimize access to the backing store 1006.

A worker process, e.g., 1012a, solicits from the work coordinator 1010 a set of tasks, e.g., 1016a, to be leased out to the worker process 1012a by sending a request, e.g., 1014a, to the work coordinator 1010. A lease is a license associated with a set of tasks. The lease allows the worker process to have access to the set of tasks to the exclusion of other worker processes during the lease time period. Upon expiration of the lease time period, the leased set of tasks are available to be leased by other tasks.

In some implementations, a worker process can specify in the request a number of tasks to be leased and/or identify one or more groups that requested tasks belong to. In further implementations, a worker process can query the work coordinator 1010 about what groups exist and/or what currently available tasks are within a certain group before the worker process decides which tasks to lease. Responsive to the request 1014a of the worker process 1012a, the work coordinator 1010 will lease the requested tasks to the worker process 1012a if the requested tasks have not been leased to other worker processes.

On the other hand, in an example where the worker process 1012a has already leased out tasks 1016a from the work coordinator 1010, a worker process 1012b or a worker process 1012c will not be allowed to lease the tasks 1016a from the work coordinator 1010 before the worker process 1012a releases the tasks 1016a. This mechanism of the work coordinator 1010 locking the leased task from being accessed by other worker processes can maintain data consistency within the system 1000.

Figure 2:
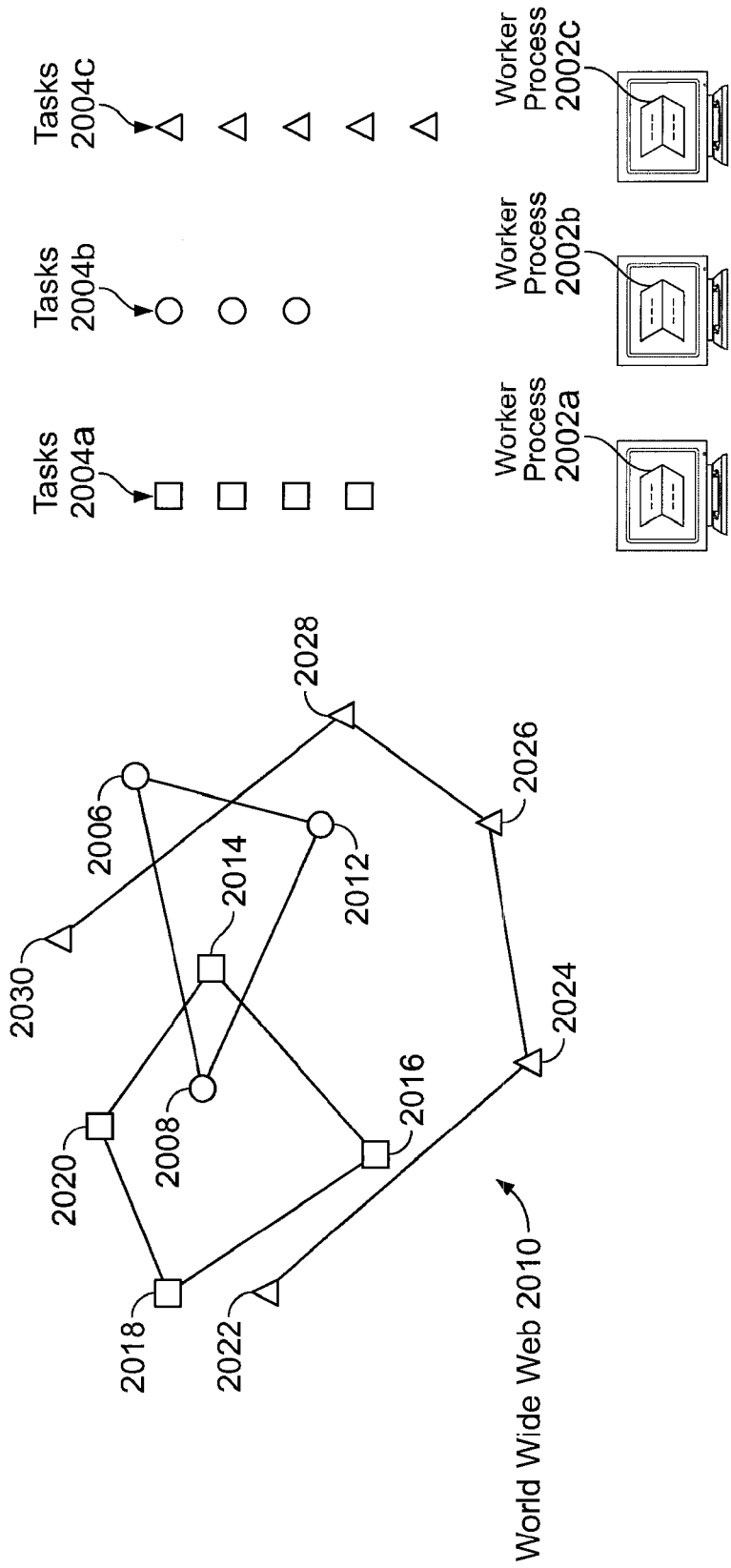
FIG. 2 illustrates an example of crawling a portion of the world wide web using parallel worker processes.

FIG. 2 illustrates an example of crawling a portion of the world wide web 2010 using parallel worker processes. In FIG. 2, multiple worker processes, e.g., 2002a-2002c each lease from the work coordinator 1010 a number of tasks 2004a-2004c within one or more groups designated for web crawling, for instance.

The work coordinator 1010 is capable of processing multiple requests simultaneously. In some implementations, the work coordinator 1010 is implemented as a single, multi-threaded process, as multiple processes on a single computing device, or as multiple processes on multiple computing devices, or as a combination of these.

For the convenience of describing the multiple components in FIG. 2, tasks being leased to different worker processes are represented by distinct shapes. For example, the tasks 2004a leased to the worker process 2002a are symbolized as squares. The tasks 2004b leased to the worker process 2002b are symbolized as circles. The tasks 2004c leased to the worker process 2002c are symbolized as triangles.

In FIG. 2, the multiple worker processes 2002a-2002c crawl web pages existent in different nodes on the world wide web 2010 in parallel (squares, triangles, and circles respectively corresponding to tasks 2004a, 2004b, and 2004c). For instance, the worker process 2002a crawls web pages in the square nodes 2014, 2016, 2018, and 2020. The worker process 2002b crawls web pages in the circle nodes 2006, 2008, and 2012. The worker process 2002c crawls web pages in the triangle nodes 2022, 2024, 2026, 2028, and 2030.

Figure 3:
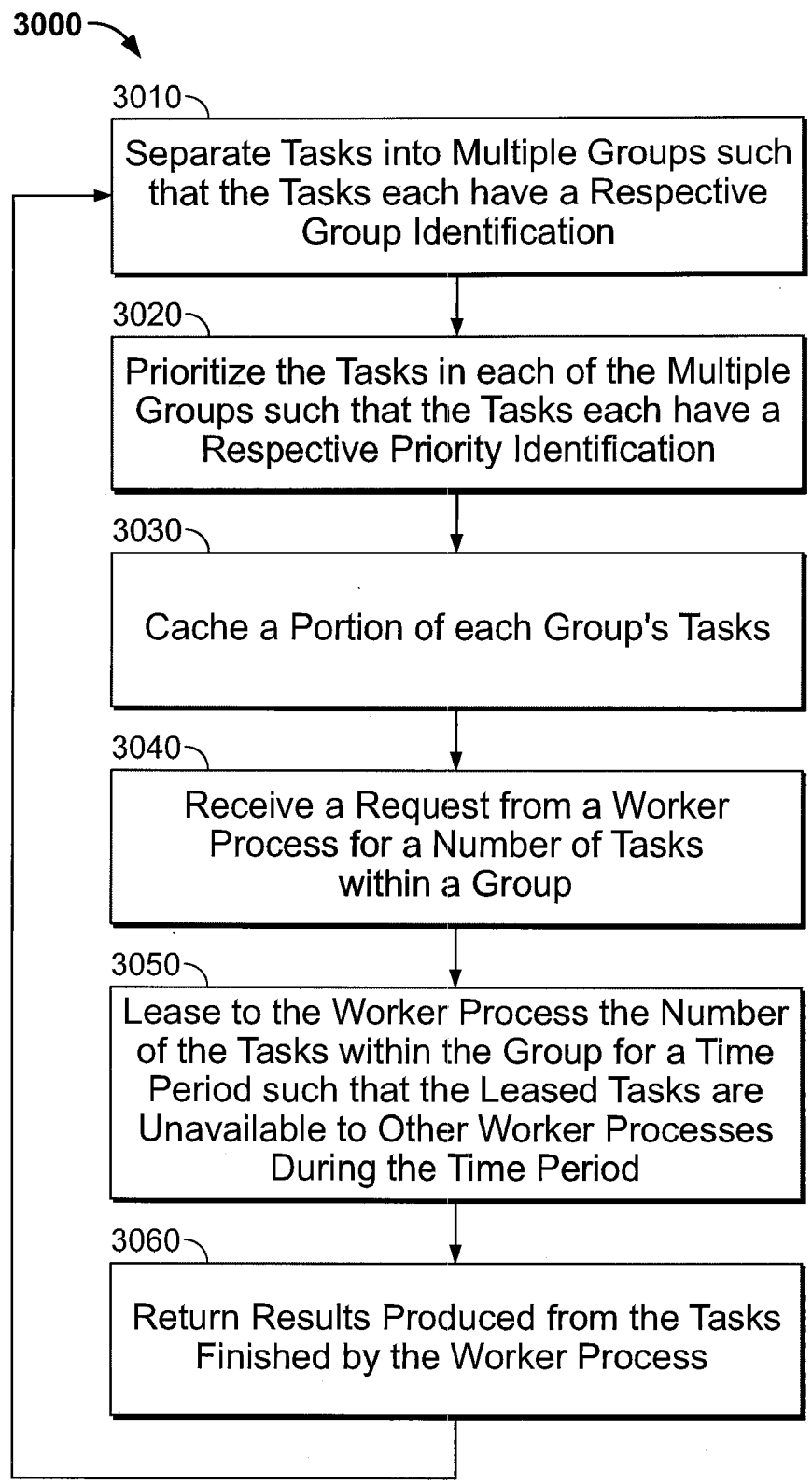
FIG. 3 illustrates an exemplary technique for leasing tasks.

FIG. 3 illustrates an exemplary technique 3000 for leasing tasks. For convenience, the technique 3000 will be described with reference to the work coordinator 1010 and other components illustrated in FIG. 1.

In the technique 3000, tasks can be separated into different groups and given respective group identifications (step 3010) to identify which group a task is separated into. Within each group, tasks can be prioritized and given respective priority identifications (step 3020) to indicate their priorities. The tasks can be stored in a backing store 1006.

In some implementations, the tasks are represented as tuples, e.g., <group identification, priority identification, task data>. The group identification and priority identification can be specified, by way of example, as alphanumeric strings, numbers, time stamps, or any data that can be used to identify tasks with a specified group and/or a specified priority. Task data describes one or more actions to be performed by a worker process and can be represented in a number of ways including, but not limited to, an array of name/value pairs, alphanumeric data, or other kinds of representations.

For example, a randomly selected task is represented as a tuple ("highpriority: craigslist.org," "2007/11/01 14:35:00: 12345," "Crawl http://la.craigslist.com/123.html"). Its group identification represents that the group of the task consists of a set of craigslist.org URLs with high priority.

Its priority identification, which records the time when the task was created, represents the priority of the task. In various implementations, tasks are logically stored in a queue and thus are accessed in a first in, first out (FIFO) order. An earlier time represents a higher priority.

Its task data describes the task as "crawl http://la.craigslist.com/123.html." A worker process which leases the task from the work coordinator 1010 is supposed to perform the action of "crawling http://la.craigslist.com/123.html" as specified in task data of the task.

In some implementations, tasks managed by the work coordinator 1010 are stored in a data storage system, e.g., a table. The data storage system is similar to a database in terms of its capability of storing and retrieving data in a large scale. In various implementations, a layout of a data storage system resembles a large spreadsheet where columns across the top represent different data fields and rows down the side represent different entries of data.

Table 1 below illustrates an example of a data storage system storing tasks for the work coordinator 1010. In Table 1, each task is stored in a row. An identifier of <group identification: generation: priority identification> of each task is stored in a Row Name field. The description of each task is stored in a Task Data field.

A generation number of a group illustrates how many times the group has been deleted or destroyed. In some implementations, a generation number is used by the work coordinator 1010 to identify a deleted group.

In Table 1, a generation number initiates with "999999999," and is deducted each time by one when a group is deleted or destroyed. For instance, Group 1 in Table 1 has a lower generation number, 999999998. The existence of a lower generation number for Group 1 means: tasks in Group 1 with a higher generation number, e.g., 999999999, have been already deleted. Consequently, when the work coordinator 1010 leases tasks to worker processes, the tasks in Group 1 with a generation number 999999999 will be ignored. Eventually, these already-deleted tasks will be collected as garbage. Optionally, a generation number of a group could be added by one or more every time when the group is deleted.]

In some implementations, tasks are organized by their group identification as well as their priority identification, as illustrated in Table 1.

In some implementations, a data storage system can be read by a primary key. For example, if a worker process requests for X number of tasks from group Y, the primary key could look through the tasks linearly from the top of the data storage system, and then retrieve the first X number of tasks in group Y. In various implementation, reading a data storage system by a primary key can be done either individually or in groups.

In some implementations, a data storage system stores metadata to facilitate data access. For instance, metadata of task groups' names can assist a work coordinator 1010 in quickly responding to a query regarding what groups exist in the work coordinator.

TABLE 1

Example of Data Storage System

| Row Name | Task Data |
|---|---|
| Group 1: 999999998: a | Crawl x |
| Group 1: 999999998: b | Crawl y |
| Group 1: 999999998: c | Crawl z |
| Group 1: 999999999: a | Crawl w |
| Group 2: 999999999: A | Extract link from x |

In some implementations, a data storage system can be distributed in multiple machines and each of the multiple machines is responsible for storing some parts of a data set. The functions with respect to data scanning and retrieving can also be provided by each of the machines.

As previously mentioned, the work coordinator 1010 can cache a portion of the tasks from each group in advance (step 3030) such that the need to scan a backing store is alleviated, thus expediting accessing tasks.

Figure 4:
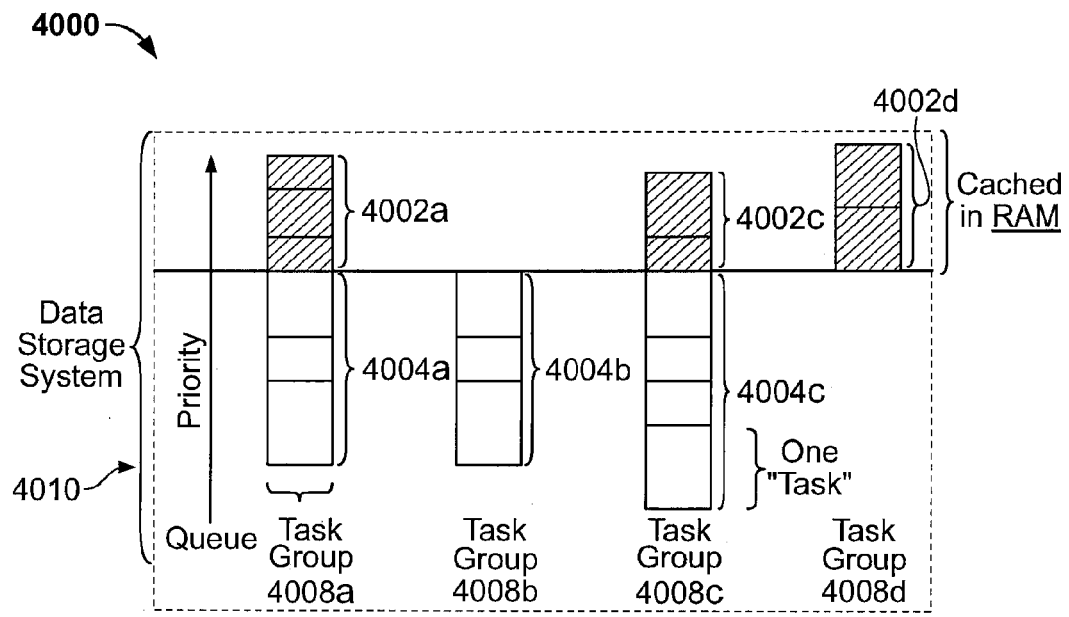
FIG. 4 illustrates an example for caching a portion of tasks from multiple groups before a work coordinator accesses the tasks.

FIG. 4 illustrates an example for caching a portion of the tasks (e.g., 4002a, 4002c, and 4002d) from a task group (e.g., 4008a, 4008c, and 4008d) before the work coordinator 1010 accesses the tasks (e.g., 4002a, 4002c, and 4002d). A data storage system 4010 of the work coordinator 1010 can be conceptually conceived as a set of priority queues 4008a-4008d. Tasks within each task group are stored in one priority queue, where upper tasks, e.g., 4002a and 4002c typically have higher priorities than lower tasks, e.g., 4004a and 4004c.

In some implementations, the work coordinator 1010 does not cache a portion of tasks from a task group before accessing the tasks. For example, when the work coordinator 1010 does not have sufficient memory or RAM to keep all task groups' (e.g., 4008a-4008d) tasks, the entire task group's (e.g., 4008b) tasks can stay in the data storage system 4010, without being cached beforehand.

In some implementations, the work coordinator 1010 caches tasks of an entire task group before accessing those tasks. For example, all tasks (e.g., 4002d) of the task group 4008d are cached in RAM or memory ready for access by the work coordinator 1010. In the example of FIG. 4, the higher-priority tasks 4002a, 4002c, and 4002d have been cached in memory or RAM from the data storage system 4010 ahead of time, ready for the work coordinator 1010 to scan and retrieve. In some implementations, when in-memory tasks are being consumed, a background thread in the work coordinator 1010 can collect more tasks from the data storage system 4010 to keep sufficient tasks in memory.

To optimize the data access rate, the work coordinator 1010 can estimate a respective portion for each group to be cached based on, for instance, access frequency of each group. By way of illustration, if the worker coordinator 1010 has found that most worker processes are interested in group X, the work coordinator 1010 can cache a relatively larger portion of tasks in group X. In some implementations, tuning of a respective portion to be cached for each group can be done dynamically and periodically.

In various implementations, the factors taken into account for determining each group's respective cached portion can include, but are not limited to, predictive leasing of each group by worker processes, and historical access frequency of each group.

A worker process in the system 1000 can send a request for a certain number of tasks within a group, which is received (step 3040) by the work coordinator 1010. For example, a worker process can request X number of tasks from group Y.

In some implementations, the work coordinator 1010 leases tasks out in batches. In other words, the number of tasks leased out to a worker process is a multiple of a predetermined number. Optionally, the number of tasks leased out is at least larger than a predetermined number.

In a scenario where the worker process does not know names of groups existent in the work coordinator 1010, the worker process can query about what groups exist therein before deciding which tasks in which groups to lease.

The requested tasks can be leased out to the requesting worker process for a time period such that the leased tasks are unavailable to other worker processes during the time period (step 3050). It is advantageous to keep leased tasks out of reach by other worker processes because this locking mechanism can maintain data consistency in the work coordinator 1010. Upon expiration of the lease, the leased tasks can be released from the leasing worker process for other worker processes to access.

Leases with a finite duration used in the work coordinator 1010 can effectively prevent loss of leased tasks when system 1000 failure occurs. For example, if the leasing worker process fails, the work coordinator 1010 can recover the tasks after the lease expires for other worker processes to access. Otherwise, the leased tasks will be indefinitely locked and ultimately lost in the system 1000, as no worker processes will be able to access them any more. In some implementations, the work coordinator 1010 determines duration of a lease. In other implementation, the leasing worker process specifies duration of the lease.

A lease renewal mechanism can be provided in the work coordinator 1010. The worker process can renew the lease to extend the lease's duration and thus will be able to work on the leased tasks for an extended time.

Figure 5:
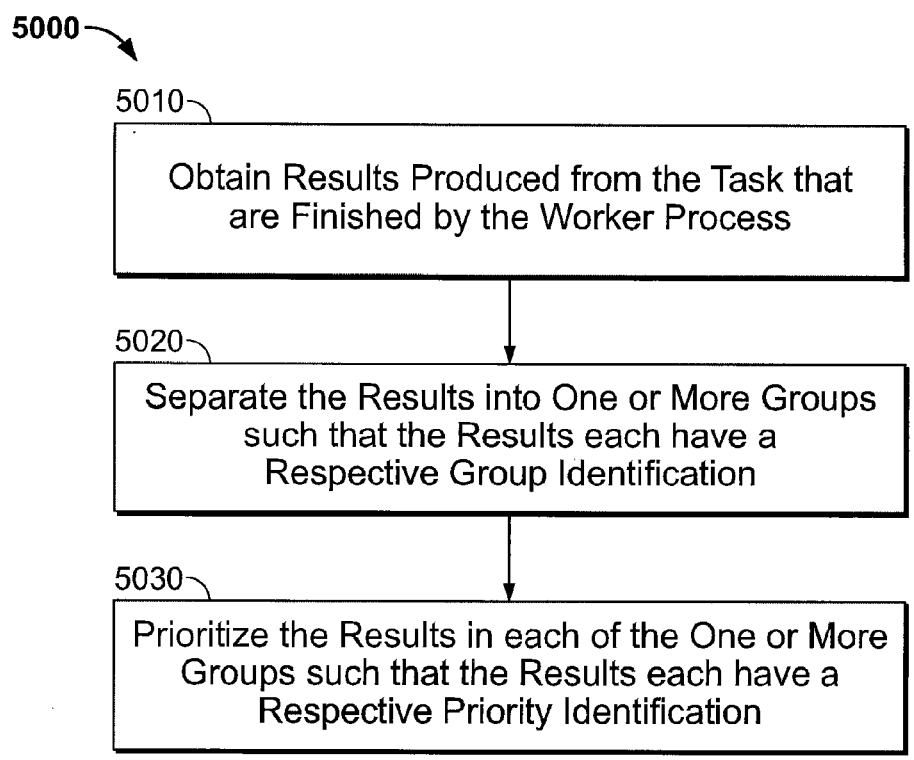
FIG. 5 illustrates an example process for returning results from finished tasks to a work coordinator and storing the returned results as new tasks.

Results from tasks finished by the worker processes can be pipelined back to the work coordinator 1010 as new tasks (step 3060). FIG. 5 illustrates an example process 5000 for returning results produced from finished tasks to the work coordinator 1010.

In the example of FIG. 5, results from the finished tasks are obtained (step 5010) as new tasks by the work coordinator 1010. The returned results can be separated into different groups and assigned respective group identifications (step 5020). Additionally, the returned results can be prioritized in each group and assigned respective priority identifications (step 5030).

By way of illustration, a first task in the example of FIG. 5 may be depicted as "to get a URL relevant to housing." A first worker process that leases the first task returns to the work coordinator 1010 a first result, "to extract all links from the URL relevant to housing." The first result is categorized and prioritized in the work coordinator 1010 as a second task, ready for worker processes to retrieve. A second worker process then leases the second task and returns a second result "to crawl all the links extracted from the URL." Further, the second result can be processed by the work coordinator 1010 as a third task. In some implementations, this recursive loop can go on and on as a simple state machine.

Figure 6:
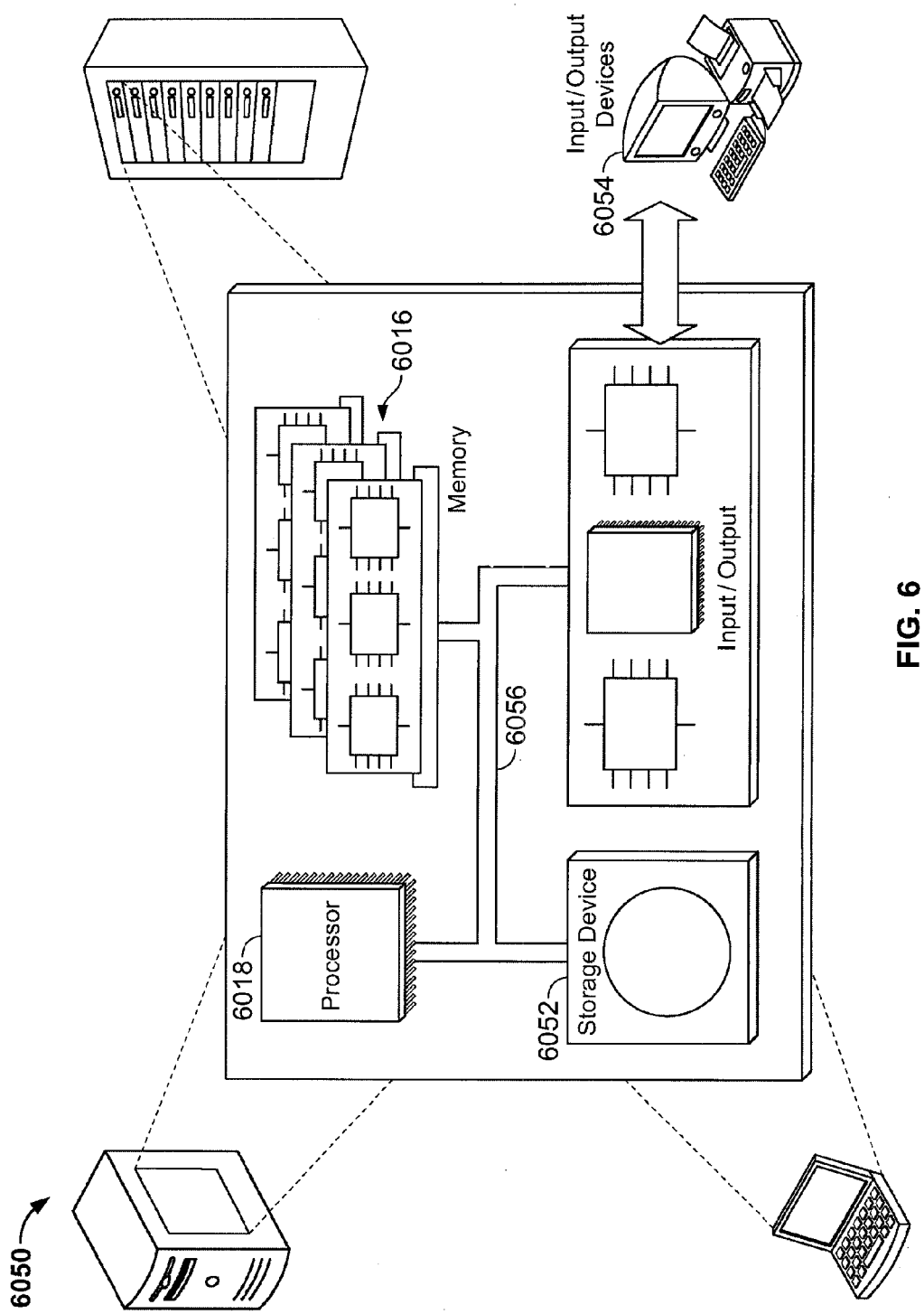
FIG. 6 is a schematic diagram of an example computer system.

FIG. 6 is a schematic diagram of an example computer system 6050. The system 6050 can be used for performing the actions and methods described above. The system 6050 can include a processor 6018, a memory 6016, a storage device 6052, and input/output devices 6054. Each of the components 6018, 6016, 6052, and 6054 are interconnected using a system bus 6056. The processor 6018 is capable of processing instructions within the system 6050. These instructions can implement one or more aspects of the systems, components, and techniques described above. In some implementations, the processor 6018 is a single-threaded processor. In other implementations, the processor 6018 is a multi-threaded processor. The processor 6018 can include multiple processing cores and is capable of processing instructions stored in the memory 6016 or on the storage device 6052 to display graphical information for a user interface on the input/output device 6054.

The memory 6016 is a computer-readable medium such as volatile or non-volatile random access memory that stores information within the system 6050. The memory 6016 can store processes related to the functionality of the work coordinator 1010 and worker processes, for example. The storage device 6052 is capable of providing persistent storage for the system 6050. The storage device 6052 can include a floppy disk device, a hard disk device, an optical disk device, or a tape device, or other suitable persistent storage mediums. The storage device 6052 can store the various databases described above. The input/output device 6054 provides input/output operations for the system 6050. The input/output device 6054 can include a keyboard, a pointing device, and a display unit for displaying graphical user interfaces.

The computer system shown in FIG. 6 is but one example. In general, embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. In some implementations, one or both of an exponential moving average function and a smoothing function can be applied to the click measure. In some implementations, a squashing function can be applied to the relative click fraction. In some implementations, the search and click data are used for analyzing search trends. In some implementations, the search and click data are used to provide suggestions for corpora other than the corpus in which a search query was issued. For example, when a given search query is issued in a base corpus, a list of non-base corpora can be returned along with search results from the base corpus. If one of the listed non-base corpora is selected, search results from the selected non-base corpus can be displayed, where the search results are responsive to the given search query.

What is claimed is:

1. A computer-implemented method comprising:
   defining tasks to be performed by one or more worker processes of a plurality of parallel worker processes and for each of a plurality of uniform resource locators to be crawled;
   distributing the tasks into a plurality of groups, each group being based on a certain type of task being performed, wherein each group is associated with a respective group identifier;
   prioritizing the tasks within each group;
   receiving a request from a worker process of the plurality of parallel worker processes for at least one task;
   in response to the request, leasing a number of highest-priority tasks within a first group to the worker process for a first time period such that the highest priority tasks are unavailable to other worker processes during the first time period;
   receiving from the worker process a designation of one or more new tasks, each new task defining a new uniform resource locator to be crawled, the new uniform resource locator being identified by the worker process during execution of one of the highest priority tasks in the first group; and
   distributing the one or more new tasks to the plurality of groups.

2. The method of claim 1, where a task specifies an action to be performed by the one or more worker processes of the plurality of parallel worker processes.

3. The method of claim 1 where the tasks are ordered in a table based on respective group identifications and respective priority identifications.

4. The method of claim 1, further comprising:
   caching a portion of the tasks within each group, where cached tasks are of a higher priority than non-cached tasks in each group.

5. The method of claim 4, further comprising:
   determining a cached portion of the tasks within each group based on predictive leasing of each group.

6. The method of claim 1, wherein the first group is specified by the worker process.

7. The method of claim 1, further comprising:
   determining that a lease for the highest priority tasks has expired based on the first time period; and
   allowing other worker processes of the plurality of parallel worker processes to lease the highest priority tasks based on the determining.

8. The method of claim 7, further comprising:
   renewing the lease for the worker process for a second time period such that the highest priority tasks are unavailable to the other worker processes during the second time period.

9. The method of claim 1, further comprising:
   obtaining a result produced from a task that is finished by the worker process; and
   storing the result as a new task in one of the groups.

10. A computer program product, encoded on a computer-readable storage device, comprising instructions that when executed by one or more processors cause the one or more processors to perform operations comprising:
   defining tasks to be performed by one or more worker processes of a plurality of parallel worker processes and for each of a plurality of uniform resource locators to be crawled;
   distributing the tasks into a plurality of groups, each group being based on a certain type of task being performed, wherein each group is associated with a respective group identifier;
   prioritizing the tasks within each group;
   receiving a request from a worker process of the plurality of parallel worker processes for a number of tasks;
   in response to the request, leasing a number of highest-priority tasks within a first group to the worker process for a first time period such that the highest priority tasks are unavailable to other worker processes during the first time period;
   receiving from the worker process a designation of one or more new tasks, each new task defining a new uniform resource locator to be crawled, the new uniform resource locator being identified by the worker process during execution of one of the highest priority tasks in the first group; and distributing the one or more new tasks to the plurality of groups.

11. The computer program product of claim 10 where a task specifies an action to be performed by the one or more worker processes of the plurality of parallel worker processes.

12. The computer program product of claim 10 where the tasks are ordered in a table based on respective group identifications and respective priority identifications.

13. The computer program product of claim 10 where the operations further comprise:

caching a portion of the tasks within each group, where cached tasks are of a higher priority than non-cached tasks in each group.

14. The computer program product of claim 13 wherein the operations further comprise:

determining a cached portion of the tasks within each group based on predictive leasing of each group.

15. The computer program product of claim 10, wherein the first group is specified by the worker process.

16. The computer program product of claim 10, where the operations further comprise:

determining that a lease for the highest priority tasks has expired based on the first time period; and allowing other worker processes of the plurality of parallel worker processes to lease the highest priority tasks based on the determining.

17. The computer program product of claim 16 where the operations further comprise:

renewing the lease for the worker process for a second time period such that the highest priority tasks are unavailable to the other worker processes during the second time period.

18. The computer program product of claim 10, where the operations further comprise:

obtaining a result produced from a task that is finished by the worker process; and storing the result as a new task in one of the groups.

19. A server system comprising:

a computer-readable medium comprising a computer program product; and one or more processors operable to execute the computer program product to perform operations comprising:

defining tasks to be performed by one or more worker processes of a plurality of parallel worker processes and for each of a plurality of uniform resource locators to be crawled;

distributing the tasks into a plurality of groups, each group being based on a certain type of task being performed, wherein each group is associated with a respective group identifier;

prioritizing the tasks within each group;

receiving a request from a worker process of the plurality of parallel worker processes for a number of tasks;

in response to the request, leasing a number of highest-priority tasks within a first group to the worker process for a first time period such that the highest priority tasks are unavailable to other worker processes during the first time period;

receiving from the worker process a designation of one or more new tasks, each new task defining a new uniform resource locator to be crawled, the new uniform resource locator being identified by the worker process during execution of one of the highest priority tasks in the first group; and distributing the one or more new tasks to the plurality of groups.

20. The server system of claim 19 where a task specifies an action to be performed by the one or more worker processes of the plurality of parallel worker processes.

21. The server system of claim 19 where the tasks are ordered in a table based on respective group identifications and respective priority identifications.

22. The server system of claim 19 where the operations further comprise:

caching a portion of the tasks within each group, where cached tasks are of a higher priority than non-cached tasks in each group.

23. The server system of claim 22 where the operations further comprise:

determining a cached portion of the tasks within each group based on predictive leasing of each group.

24. The server system of claim 19 wherein the first group is specified by the worker process.

25. The server system of claim 19 where the operations further comprise:

determining that a lease for the highest priority tasks has expired based on the first time period; and allowing other worker processes of the plurality of parallel worker processes to lease the highest priority tasks based on the determining.

26. The server system of claim 25, where the operations further comprise:

renewing the lease for the worker process for a second time period such that the highest priority tasks are unavailable to the other worker processes during the second time period.

27. The server system of claim 19, where the operations further comprise:

obtaining a result produced from a task that is finished by the worker process; and storing the result as a new task in one of the groups.

* * * * *